United States Patent Office 3,102,022
Patented Aug. 27, 1963

3,102,022
HERBICIDAL METHOD
John P. Chupp and Angelo John Speziale, Kirkwood, Mo., assignors to Monsanto Chemical Company, St. Louis, Mo., a corporation of Delaware
No Drawing. Filed Nov. 8, 1960, Ser. No. 67,932
4 Claims. (Cl. 71—2.7)

This invention relates to methods of selectively inhibiting the germination and preemergent growth of plants in contact with soil which methods comprise treating the soil with a herbicidal amount of an N-alkenylcarbamoylmethyl phosphorothioate of the structure

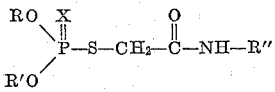

wherein R and R' are like or unlike alkyl or alkoxyalkyl radicals containing 1 to 4 carbon atoms (e.g. methyl, ethyl, propyl, butyl, methoxyethyl, ethoxyethyl, methoxypropyl, and the various isomeric forms thereof), wherein X is a chalkogen of atomic weight less than 40 (i.e. sulfur or oxygen, preferably sulfur), and wherein R'' is a radical of the structure

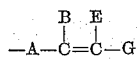

wherein A is a divalent radical having the empirical formula $C_nH_{2n}$ wherein $n$ is a whole number from 1 to 3, wherein B is halogen or $-(CH_2)_bH$ wherein $b$ is an integer from 0 to 2, inclusive, wherein E is halogen or $-(CH_2)_eH$ wherein $e$ is an integer from 0 to 2 inclusive, wherein G is halogen or $-(CH_2)_gH$ wherein $g$ is an integer from 0 to 2, inclusive, and wherein the sum total of $b$, $e$, and $g$ (i.e. $b+e+g$) is a whole number from 1 to 3. (By "halogen" is meant halogens having an atomic number in the range of 16 to 36, i.e. chlorine or bromine.) As illustrative of R'' is allyl, methallyl, ethallyl, but-2-enyl, but-3-enyl, n-pent-2-enyl, isopent-2-enyl, 2-chloroallyl, 2-bromoallyl, 2,3-dichloroallyl, 2,3,3-trichloroallyl, 3-chlorobut-2-enyl, 2,3-dichlorobut-2-enyl, etc. It is preferred that R and R' be straight chain alkyl radicals containing from 2 to 3 carbon atoms and that R'' be of an allylic structure (that is $-CH_2-\underset{|}{C}=\underset{|}{C}$)

and have the empirical formula $C_3H_{5-m}Cl_m$ wherein $m$ is an integer from 0 to 3, preferably 0.

These phosphorothioates can be prepared by reacting a salt (e.g. ammonium or alkali metal such as sodium, potassium or lithium) of a phosphorothioic acid of the structure

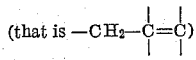

wherein R, R' and X have the aforedescribed significance with a substantially equimolecular amount of a halide of the structure

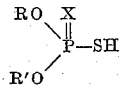

wherein R'' has the aforedescribed significance and D is a halogen having an atomic number in the range of 16 to 36 (i.e. chlorine or bromine). Where and when desired an inert organic solvent such as acetone, butanone, dioxane, benzene, toluene, xylene, etc. can be used. While a wide range of reaction temperatures can be used provided the system is fluid (i.e. above the freezing point of the reaction system and up to and including its melting point) it is preferred to employ a reaction temperature in the range of 20° C. to 120° C.

To illustrate the preparation of the aforementioned phosphorothioates is the following.

EXAMPLE I

To a suitable reaction vessel equipped with a thermometer, agitator and reflux condenser is charged approximately 23.3 parts by weight (substantially 0.115 mol.) of ammonium O,O-diethyl phosphorodithioate, approximately 13.3 parts by weight (substantially 0.1 mol.) of alpha-chloro N-allyl acetamide, and approximately 80 parts by weight of acetone. While agitating the so-charged mass is heated up to the reflux temperature and then refluxed for 4 hours. The reaction mass is then cooled to room temperature and filtered. The filter cake is washed with acetone and the washings combined with the original filtrated. The solution is then stripped of acetone under vacuum, and the residue taken up with methylene dichloride. This solution is then washed first with 5% aqueous sodium carbonate and then with water. The so-washed solution is then stripped of methylene dichloride under vacuum. The residue, an oil, is O,O-diethyl S-(N-allylcarbamoylmethyl) phosphorodithioate.

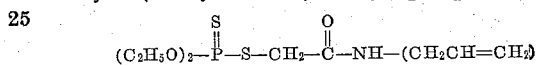

which is insoluble in water.

*Analysis.*—Theory: 10.95% P, 22.6% S. Found: 10.4% P, 23.4% S.

EXAMPLE II

Employing the procedure of Example I but replacing ammonium O,O-diethyl phosphorodithioate with an equimolecular amount of potassium O,O-di-n-propyl phosphorodithioate there is obtained O,O-di-n-propyl S-(N-allylcarbamoylmethyl) phosphorodithioate, an oil which is insoluble in water.

EXAMPLE III

Employing the procedure of Example I but replacing alpha-chloro N-allyl acetamide with an equimolecular amount of alpha-bromo N-(2-chloroallyl) acetamide there is obtained O,O-diethyl S-[N-(2-chloroallyl)carbamoylmethyl] phosphorodithioate which is insoluble in water.

EXAMPLE IV

Employing the procedure of Example I but replacing ammonium O,O-diethyl phosphorodithioate with an equimolecular amount of potassium O,O-di(2-methoxyethyl) phosphorothioate there is obtained as a water-insoluble product O,O-di(2-methoxyethyl) S-(N-allyl carbamoylmethyl) phosphorothioate.

EXAMPLE V

Employing the procedure of Example I but replacing alpha-chloro N-allyl acetamide with an equimolecular amount of alpha-bromo N-(2,3,3-trichloroallyl) acetamide there is obtained as a water-insoluble product O,O-diethyl S-[N-(2,3,3-trichloroallyl)carbamoylmethyl] phosphorodithioate.

The phosphorothioates of this invention are useful for selectively inhibiting the germination and preemergent growth of plants from seed in contact with soil and to illustrate their relative activity is the following test procedure.

Seeds of several different plants (itemized hereinafter) each representing a principal botanical species are planted in aluminum pans (9½" x 5¼" x 2¾"). A good grade of top soil which has been treated with 0.05% of a resinous polyelectrolyte soil conditioner is compacted to a depth of ⅜″ from the top of the pan. The grass seeds are scattered randomly over one-half of the soil surface and the broadleaf seeds are scattered randomly over the remaining one-half of the soil surface. The seeds are then covered with ⅜″ of the prepared soil mixture and the pan leveled.

The leveled surface of the soil in the pan is then sprayed with 15 cc. of acetone containing the test compound dissolved therein at a rate of 25 lbs. per acre.

After spraying the soil surface, the pan is placed in a sand bench and ½″ of water added to the bench. The soil absorbs moisture through perforations in the bottom until the soil surface is about one-half moist, by which time the excess water in the sand bench is drained off. The remaining soil surface is moistened by capillary action.

Fourteen days after application of the test compound the results are observed and recorded. The number of plants of each species which germinated and grew are counted and converted to a herbicidal rating by means of a fixed scale based on average percent germination. (Germination rates are established for all new seed lots and periodic checks run on old seed in current use.) The scale used is as follows:

*Herbicidal Rating—Conversion Scale*

| Seed Lot, Percent Germination (Control) | 3 | 2 | 1 | 0 |
|---|---|---|---|---|
| | (Number of plants surviving) | | | |
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |

The relative value of the test compound with respect to its herbicidal effect on each plant is indicated by a number as follows:

0 _____ No germination inhibition.
1 _____ Slight germination inhibition.
2 _____ Moderate germination inhibition.
3 _____ Severe germination inhibition.

In the following table of herbicidal evaluation the test compound is O,O-diethyl S-(N-allylcarbamoylmethyl) phosphorodithioate.

*Extent[1] of Germination Inhibition*
Plant:
Wild oat _____ 0
Brome grass _____ 0
Rye grass _____ 2
Radish _____ 0
Sugar beet _____ 0
Foxtail _____ 3
Crab grass _____ 3
Pigweed _____ 3
Soybean _____ 3
Wild buckwheat _____ 1
Tomato _____ 0
Sorghum _____ 3

[1] 3—severe; 2—moderate; 1—slight; 0—no.

From the foregoing evaluation data it is apparent that the phosphorothioates of this invention are selective and effective pre-emergence herbicides. Valuable selective herbicidal effects will be observed by applications of small amounts, for example, as low as 5 lbs. of active component per acre as well as high concentrations, for example 100 lbs. per acre. The selective activity on grasses is more pronounced at lower rates of application, for example from 5 to 20 lbs. per acre. For selective herbicidal effect on both the grasses and dicotyledonous plants, it will be found necessary to use from 20 to 50 lbs. per acre.

It will be apparent that quite different effects can be obtained by modifying the method of use. For this reason an essential part of this invention is the formulation so as to permit a uniform predetermined application of herbicide to the surface or sub-surface of the soil so as to produce the desired effect. By proper selection and proportioning of the various extending agents either liquid or solid formulations can be prepared, and so as to adapt the herbicide for achieving the desired result with any conventional device for treating the surface or subsurface of the soil or other growth media.

Although the phosphorothioates of this invention are useful per se in controlling the germination and pre-emergent growth a wide variety of plants, it is preferable that they be supplied to the plant growing medium in a dispersed form in a suitable extending agent.

In the instant specification and appended claims it is to be understood that the term "dispersed" is used in its widest possible sense. When it is said that the phosphorothioates of this invention are dispersed, it means that the particles of the phosphorothioates of this invention may be molecular in size and held in true solution in a suitable organic solvent. It means further that the particles may be colloidal in size and distributed throughout a liquid phase in the form of suspensions or emulsions or in the form of particles held in suspension by wetting agents. The term "dispersed" also means that the particles may be mixed with and distributed throughout a solid carrier providing a mixture in particulate form, e.g. pellets, granules, powders, or dusts.

In the instant specification and appended claims it is to be understood that the expression "extending agent" includes any and all of those substances in which the phosphorothioates of this invention are dispersed. It includes therefore, the solvents of a true solution, the liquid phase of suspensions, or emulsions and the solid phase of particulate solids, e.g. pellets, granules, dusts and powders.

The exact concentration of the phosphorothioates of this invention employed in combatting or controlling noxious vegetation can vary considerably provided the required dosage (i.e. herbicidal amount) thereof is supplied to the plant growing medium. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared herbicidal spray or particulate solid. In such a concentrate composition, the phosphorothioate generally will be present in a concentration of 5 to 95 percent by weight, the residue being any one or more of the well-known herbicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the phosphorothioates of this invention. For example, isopropyl, ether, acetone, methyl ethyl ketone, dioxane, cyclohexanone, carbon tetrachloride, ethylene dichloride, tetrachloroethane, hexane heptane and like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The phosphorothioates of this invention are preferably supplied to the plant growing medium in the form of emulsions or suspensions. Emulsions or suspensions are prepared by dispersing the phosphorothioate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition page 280). These surfactants include the well-known capillary active substances which may be anion-active (or anionic), cation-active (or cationic), or non-ionizing or (non-ionic) which are described in detail in volumes I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued August 5, 1958). In general it is preferred that a mixture of water-soluble anionic and water-soluble non-ionic surfactants be employed.

The phosphorothioates of this invention can be dispersed by suitable methods (e.g. tumbling or grinding) in solid extending agents either of organic or inorganic nature and supplied to the plant growing medium in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. bentonite. These mixtures can be used for herbicidal purposes in the dry form or by addition of water-soluble surfactants or wetting agents. The dry particulate solids can be rendered wettable by water so as to obtain stable aqueous dispersions or suspensions suitable for use as sprays.

In all the forms described above the dispersions can be provided ready for use in combatting noxious vegetation or they can be provided in a concentrated form suitable for mixing with or dispersing in other extending agents. As illustrative of a particularly useful concentrate is an intimate mixture of phosphorothioate of this invention with a water-soluble surfactant which lowers the surface tension of water in the weight proportions of 0.1 to 15 parts of surfactant with sufficient of the phosphorothioate of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of O,O-diethyl S-(N-allylcarbamoylmethyl) phosphorodithioate and 5 parts by weight of a water-soluble nonionic surfactant such as the polyoxyethylene derivative of sorbitan monolaurate.

Another useful concentrate adapted to be made into a spray for combatting noxious vegetation is a solution (preferably as concentrated as possible) of a phosphorothioate of this invention in an organic solvent therefore. The said liquid concentrate preferably contains dissolved therein a minor amount (e.g. 0.5 to 10 percent by weight of the weight of the new herbicidal agent) of a surfactant (or emulsifying agent), which surfactant is also water-soluble. As illustrative of such a concentrate is a solution of O,O-di-n-propyl S-(N-allylcarbamoylmethyl) phosphorodithioate in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole or sorbitan monoester of alkylphenol.

In all of the various dispersions described hereinbefore for herbicidal purposes, the active ingredient can be one or more of the compounds of this invention. The compounds of this invention can also be advantageously employed in combination with other pesticides, including, for example, nematocides, bactericides, and insecticides. In this manner it is possible to obtain mixtures which are effective against a wide variety of pests and other forms of noxious life.

When operating in accordance with the present invention growth inhibiting amounts of the compound or a composition containing same are dispersed or distributed in any convenient fashion in soil or other growth media, for example by simple mixing with the soil or by applying to the surface of the soil and thereafter dragging or disking the soil to the desired depth, or by injection or drilling techniques whereby the phosphorothioate of this invention is deposited beneath the surface of the soil, or by employment of a liquid carrier (solvent or non-solvent) to accomplish the penetration and impregnation. The application of the spray and dust compositions to the surface of the soil may be accomplished by conventional methods, e.g. with power dusters, boom or hand sprayers or spray dusters.

While this invention has been described with respect to certain embodiments, it is to be understood that it is not so limited and that variations and modifications thereof obvious to those skilled in the art can be made without departing from the spirit and scope thereof.

What is claimed is:

1. The method of selectively inhibiting the germination and preemergent growth of plants in contact with soil which comprises treating said soil with an N-alkenyl-carbamoylmethyl phosphorothioate of the structure

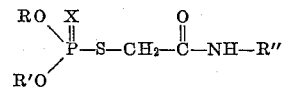

wherein R and R' are selected from the group consisting of alkyl and alkoxyalkyl radicals containing from 1 to 4 carbon atoms, wherein X is a chalkogen of atomic weight less than 40, wherein R" contains from 3 to 5 carbon atoms and is selected from the group consisting of alkenyl, chlorine substituted alkenyl and bromine substituted alkenyl, the primary carbon atom of said R" containing two hydrogen substituents.

2. The method of selectively inhibiting the germination and preemergent growth of plants in contact with soil which comprises treating said soil with a plant growth inhibiting amount of a phosphorodithioate of the structure

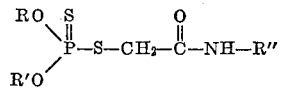

wherein R and R' are straight chain alkyl radicals containing from 2 to 3 carbon atoms and wherein R'' is a radical of an allylic structure having the empirical formula $C_3H_{5-m}Cl_m$ wherein $m$ is an integer from 0 to 3.

3. The method of selectively inhibiting the germination and preemergent growth of grasses from seeds in contact with soil which comprises treating said soil with a grass growth inhibiting amount of a phosphorodithioate of the structure

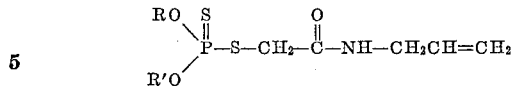

wherein R and R' are straight chain alkyl radicals containing from 2 to 3 carbon atoms.

4. The method of claim 3 wherein the phosphorodithioate is O,O-diethyl S-(N-allylcarbamoylmethyl) phosphorodithioate.

References Cited in the file of this patent
UNITED STATES PATENTS 2,959,610     Young et al. _____ Nov. 8, 1960

FOREIGN PATENTS 164,112     Sweden _____ July 22, 1958